US010095856B2

(12) United States Patent
Shibata et al.

(10) Patent No.: US 10,095,856 B2
(45) Date of Patent: Oct. 9, 2018

(54) COMMUNICATION DEVICE CAPABLE OF PERFORMING A WIRELESS COMMUNICATION ACCORDING TO NFC (ABBREVIATION OF NEAR FIELD COMMUNICATION) STANDARD

(71) Applicant: BROTHER KOGYO KABUSHIKI KAISHA, Nagoya-shi, Aichi (JP)

(72) Inventors: Hiroshi Shibata, Obu (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/712,607

(22) Filed: Sep. 22, 2017

(65) Prior Publication Data

US 2018/0096123 A1   Apr. 5, 2018

(30) Foreign Application Priority Data

Sep. 30, 2016   (JP) .................................. 2016-194575

(51) Int. Cl.
*G06K 15/00*      (2006.01)
*G06F 21/35*      (2013.01)
(Continued)

(52) U.S. Cl.
CPC ............ *G06F 21/35* (2013.01); *G06F 3/1222* (2013.01); *G06F 3/1238* (2013.01);
(Continued)

(58) Field of Classification Search
USPC ....... 358/1.1–3.29, 1.11–1.18; 370/329–333, 370/346; 445/415–421, 41.1, 41.2, 557, 445/558
See application file for complete search history.

(56) References Cited

U.S. PATENT DOCUMENTS

2012/0040611 A1*   2/2012   Griffin .............. H04W 52/0254
                                                    455/41.1
2014/0038519 A1*   2/2014   Asakura ................ H04W 76/04
                                                    455/41.1
(Continued)

FOREIGN PATENT DOCUMENTS

JP    2010-198505 A    9/2010
JP    2015-069458 A    4/2015
(Continued)

OTHER PUBLICATIONS

2010 Wi-Fi Alliance, Wi-Fi Peer-to-Peer (P2P) Technical Specification Version 1.1.
U.S. Appl. No. 15/471,311, filed Mar. 28, 2017.

*Primary Examiner* — Marcellus Augustin
(74) *Attorney, Agent, or Firm* — Scully, Scott, Murphy & Presser, PC

(57) ABSTRACT

A communication device may receive a first specific signal not including authentication information from a first terminal device via an NFC interface, change an operation mode of the NFC interface from a first operation mode to a third operation mode, supply first authentication information to the NFC interfac, store first authentication information in a predetermined area, change the operation mode of the NFC interface from the third operation mode to the first operation mode, receive a second specific signal including the first authentication information from the first terminal device via the NFC interface and execute an authentication using the first authentication information by determining whether the first authentication information included in the second specific signal is stored in the predetermined area without changing the operation mode of the NFC interface from the first operation mode in a case where the second specific signal is received.

12 Claims, 10 Drawing Sheets

(51) Int. Cl.
  *G06F 3/12*    (2006.01)
  *G06F 21/60*   (2013.01)
  *H04N 1/00*    (2006.01)
  H04W 4/80      (2018.01)
  H04W 4/00      (2018.01)

(52) U.S. Cl.
  CPC ....... *G06F 21/608* (2013.01); *H04N 1/00342* (2013.01); *H04N 2201/006* (2013.01); *H04N 2201/0041* (2013.01); *H04W 4/008* (2013.01); *H04W 4/80* (2018.02)

(56) References Cited

U.S. PATENT DOCUMENTS

| | | | |
|---|---|---|---|
| 2014/0168687 A1 | 6/2014 | Kim et al. | |
| 2014/0293980 A1* | 10/2014 | Shibata | H04W 88/06 370/338 |
| 2014/0349577 A1* | 11/2014 | Matsuda | H04W 4/008 455/41.2 |
| 2015/0029532 A1 | 1/2015 | Lee et al. | |
| 2015/0092225 A1 | 4/2015 | Kaigawa | |
| 2015/0096014 A1 | 4/2015 | Terashita | |
| 2015/0096015 A1 | 4/2015 | Ren | |
| 2015/0099502 A1* | 4/2015 | Park | H04W 4/16 455/418 |
| 2016/0127581 A1* | 5/2016 | Suzuki | H04N 1/00307 358/1.15 |
| 2017/0289742 A1* | 10/2017 | Asakura | H04W 76/023 |

FOREIGN PATENT DOCUMENTS

| | | |
|---|---|---|
| JP | 2015-069509 A | 4/2015 |
| JP | 2015-069559 A | 4/2015 |

* cited by examiner

FIG. 4

| Communication Type | | Determination Method | Target Device |
|---|---|---|---|
| Type A | | Not Supporting ISO_DEP | Authentication Card of Mifare Type |
| | | Supporting ISO_DEP and Data Size = 7bytes | Authentication Card of Mifare Desfire Type |
| | | Supporting ISO_DEP and Data Size = 4bytes | Mobile Terminal |
| Type F | | IC Type is Predetermined Type | Mobile Terminal |
| | | IC Type is not Predetermined Type | Authentication Card |
| Type V | | — | Authentication Card |

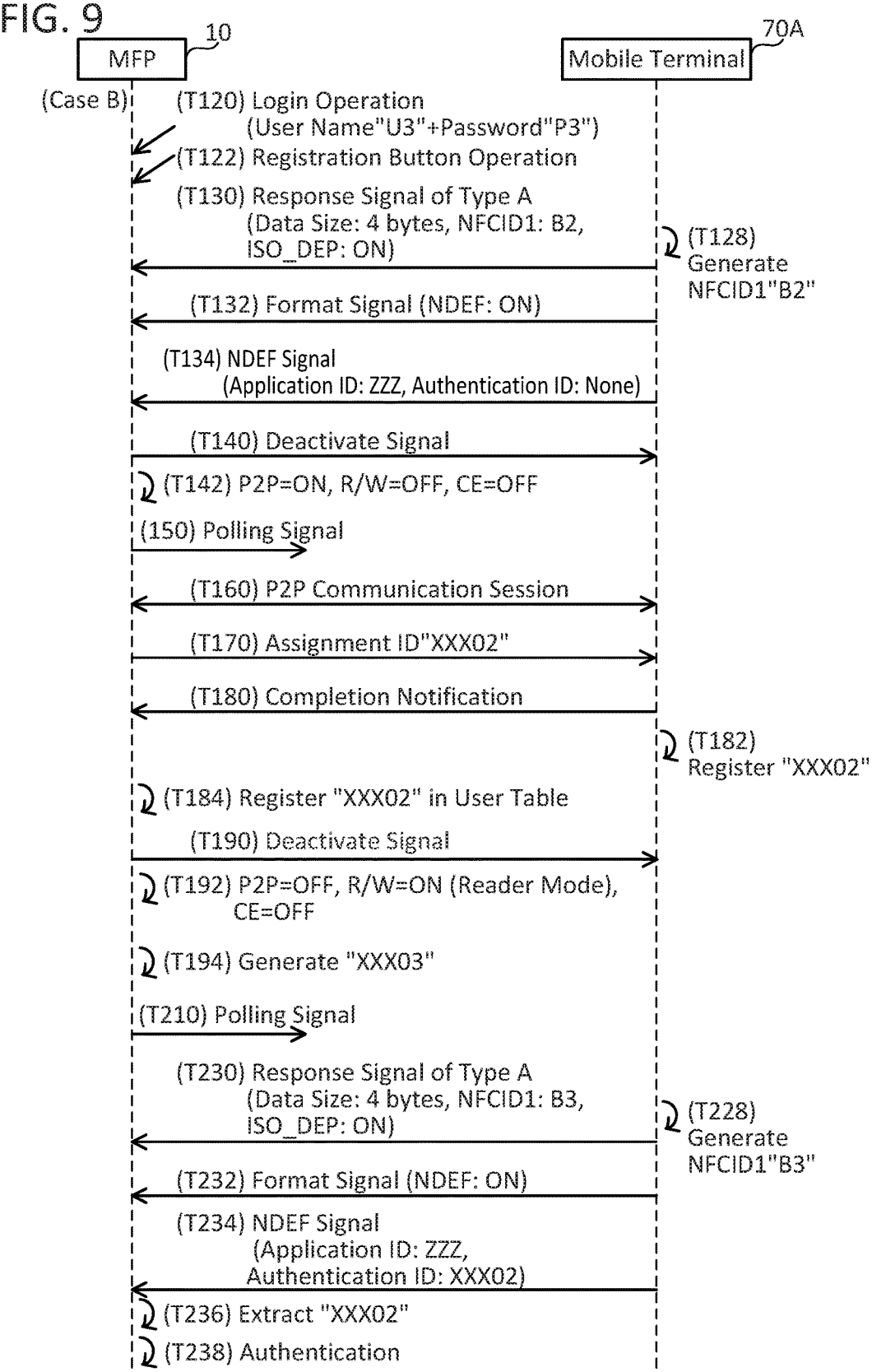

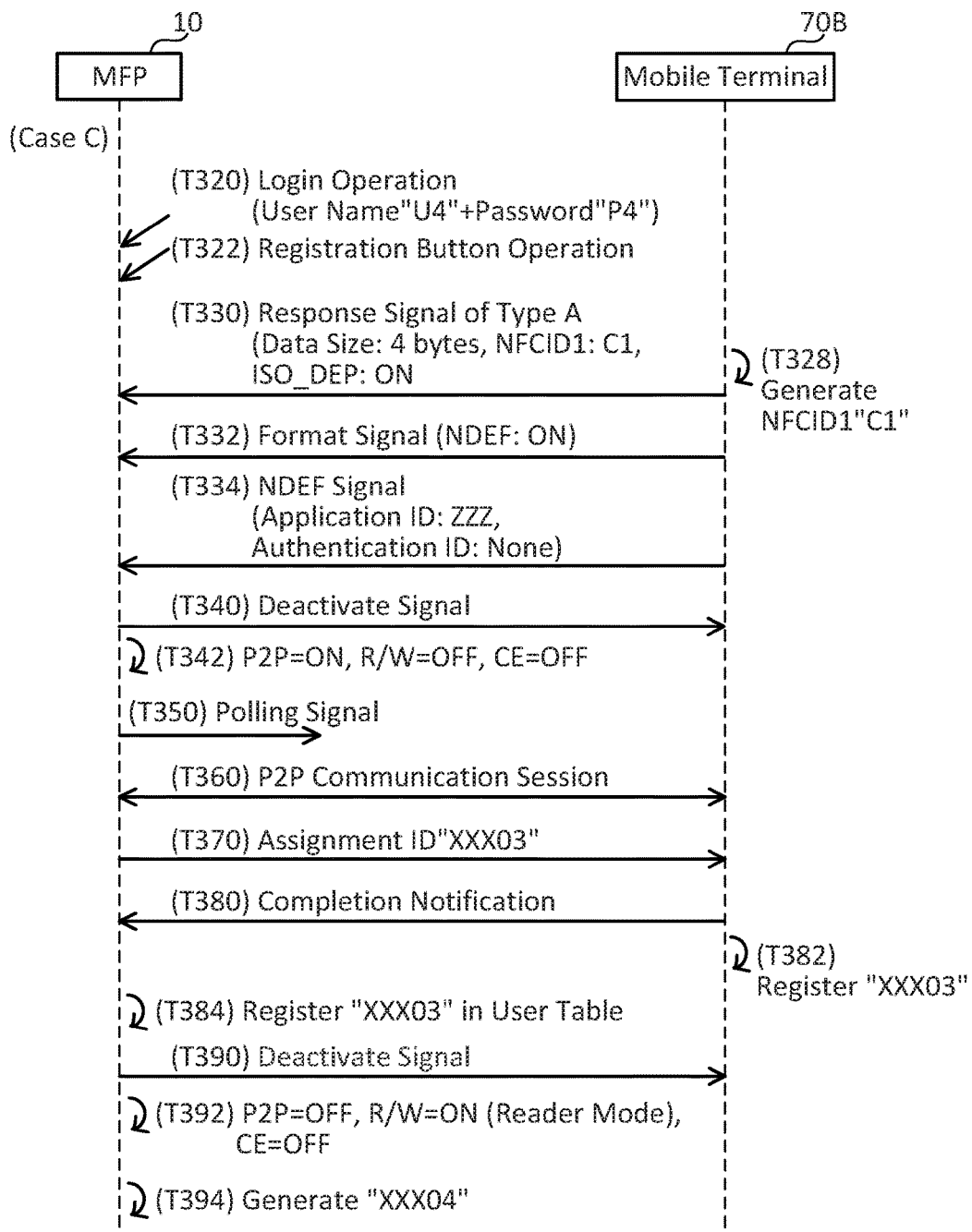

COMMUNICATION DEVICE CAPABLE OF PERFORMING A WIRELESS COMMUNICATION ACCORDING TO NFC (ABBREVIATION OF NEAR FIELD COMMUNICATION) STANDARD

TECHNICAL FIELD

The present disclosure discloses a communication device capable of performing a wireless communication according to NFC (abbreviation of Near Field Communication) standard.

BACKGROUND ART

A communication system including a multi-function peripheral and a mobile terminal is known. When an application is activated by a user, the mobile terminal determines whether a device ID assigned from the multi-function peripheral is being stored, and operates in a P2P (abbreviation of Peer To Peer) mode of the NFC standard in a case of determining that the device ID is not being stored, and operates in a CE (abbreviation of Card Emulation) mode in a case of determining that the device ID is being stored. In a case where the mobile terminal operates in the P2P mode, the multi-function peripheral operates in the P2P mode, and sends the device ID to the mobile terminal by using an NFC communication. In a case where the mobile terminal operates in the CE mode, the multi-function peripheral operates in the R/W (abbreviation of Reader/Writer) mode, receives the device ID from the mobile terminal by using an NFC communication, and executes an authentication using the device ID.

SUMMARY

In the above technique, the multi-function peripheral determines in which mode the multi-function peripheral operates in response to the mode in which the mobile terminal operates.

In the present disclosure, a technique is presented allowing a communication device to execute an authentication appropriately by using authentication information, without depending on an operation mode of a terminal device, by changing whether or not to change an operation mode of an NFC interface in response to a signal received from the terminal device.

A communication device described in the disclosure may comprise an NFC (abbreviation of Near Field Communication) interface configured to perform a wireless communication according to NFC standard; a processor; and a memory storing computer-readable instructions therein, the computer-readable instructions, when executed by the processor, causing the communication device to: receive a first specific signal not including authentication information from a first terminal device via the NFC interface in a case where the NFC interface operates in a first operation mode of the NFC standard and the first terminal device operates in a second operation mode of the NFC standard, the first operation mode being for the communication device to receive a signal via the NFC interface; change the operation mode of the NFC interface from the first operation mode to a third operation mode of the NFC standard in a case where the first specific signal is received, the third operation mode being for the communication device to send a signal via the NFC interface; supply first authentication information to the NFC interface in the case where the first specific signal is received, wherein the NFC interface operates in the third operation mode and sends the first authentication information to the first terminal device; store the first authentication information in a predetermined area of the memory in the case where the first specific signal is received; change the operation mode of the NFC interface from the third operation mode to the first operation mode in a case where the first authentication information has been sent to the first terminal device; receive a second specific signal including the first authentication information from the first terminal device via the NFC interface in a case where the NFC interface operates in the first operation mode and the first terminal device operates in the second operation mode after the operation mode of the NFC interface has been changed from the third operation mode to the first operation mode; and execute an authentication using the first authentication information by determining whether the first authentication information included in the second specific signal is stored in the predetermined area without changing the operation mode of the NFC interface from the first operation mode in a case where the second specific signal is received.

A control method, computer-readable instructions, and a non-transitory computer-readable medium storing the computer-readable instructions, for implementation of the aforementioned communication device are also novel and useful. Further, a communication system which comprises the aforementioned communication device and a terminal device, are also novel and useful.

BRIEF DESCRIPTION OF THE DRAWINGS

FIG. 4 shows a table for describing methods for determining a type of a target device;
FIG. 9 shows a sequence diagram of a case B of executing an authentication;
and
FIG. 10 shows a sequence diagram of a case C of sending an assignment ID generated in case B to another mobile terminal.

EMBODIMENTS (Configuration of Communication System 2; FIG. 1)

As shown in FIG. 1, a communication system 2 comprises a multi-function peripheral 10 (called "MFP (abbreviation of Multi-Function Peripheral)" below), and a mobile terminal 70. The devices 10, 70 are capable of performing a wireless communication (called "NFC communication" below) according to the NFC (abbreviation of Near Field Communication) system. In a case of receiving authentication ID from the mobile terminal 70 by using the NFC communication, the multi-function peripheral 10 is capable of executing an authentication (i.e., authentication of a user of the mobile terminal 70) by using the authentication ID. Further, the multi-function peripheral 10 can receive the authentication ID from an authentication card 50 by using the NFC communication and, in this case, executes an authentication (i.e., authentication of a user of the authentication card 50) by using the authentication ID.

(Configuration of MFP 10)

Figure 1:
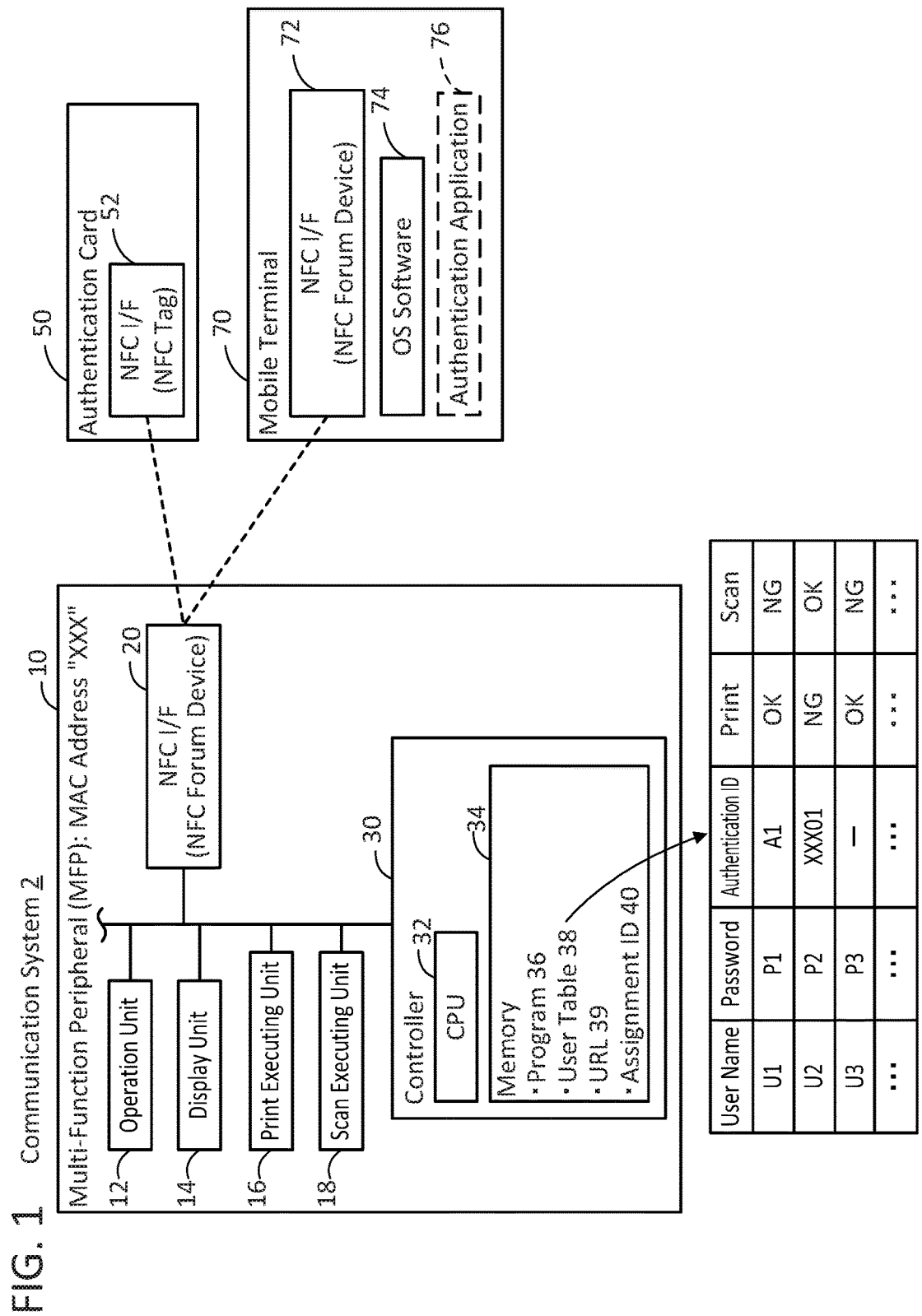
FIG. 1 shows configuration of a communication system.

The MFP 10 is a peripheral device (i.e., a peripheral device of the mobile terminal 70, etc.) capable of executing multiple functions including a printing function and a scanning function. The MFP 10 comprises an operation unit 12, a display unit 14, a print executing unit 16, a scan executing unit 18, an NFC I/F 20, and a controller 30.

The operation unit 12 comprises a plurality of keys. The user can input various instructions to the MFP 10 by operating the operation unit 12. The display unit 14 is a display for displaying various information. The display unit 14 also functions as a so-called touch panel. That is, the display unit 14 also functions as an operation unit. The print executing unit 16 is an ink jet scheme, laser scheme, etc. printing mechanism. The scan executing unit 18 is a CCD, CIS, etc. scanning mechanism.

The NFC I/F 20 is an I/F for executing an NFC communication. The NFC system is a wireless communication system based on international standards such as e.g., ISO/IEC14443, 15693, 18092. Moreover, an I/F called an NFC forum device (NFC Forum Device), and an I/F called an NFC tag (NFC Tag), are known as types of I/F for executing an NFC communication. The NFC forum device is an I/F capable of selectively operating in any one or more modes of P2P (abbreviation of Peer To Peer) mode, R/W (abbreviation of Reader/Writer) mode, and CE (abbreviation of Card Emulation) mode. The NFC tag is not an I/F capable of selectively operating in any of these modes, and functions as an IC (abbreviation of Integrated Circuit) tag of the NFC system. The NFC I/F 20 is an NFC forum device, and is capable of operating in the P2P mode and the R/W mode. The NFC I/F 20 may be capable or incapable of operating in the CE mode.

The P2P mode is a mode for performing bidirectional communication between one NFC apparatus operating in the P2P mode and another NFC apparatus operating in the P2P mode. The R/W mode and the CE mode are modes for performing unidirectional communication between one NFC apparatus operating in the R/W mode and another NFC apparatus operating in the CE mode. Moreover, the CE mode may be a CE mode requiring a secure element, or an HCE (abbreviation of Host Card Emulation) mode not requiring a secure element. The Reader mode in the R/W mode is a mode for reading data from an NFC apparatus operating in the CE mode. The Writer mode in the R/W mode is a mode for writing data to an NFC apparatus operating in the CE mode. Moreover, an NFC apparatus operating in the R/W mode can read data from an NFC tag, and write data to the NFC tag.

The controller 30 comprises a CPU 32 and a memory 34. The CPU 32 performs various processes in accordance with a program 36 stored in the memory 34. The memory 34 is configured by a volatile memory, non-volatile memory, etc. Further, in addition to the program 36, the memory 34 stores a user table 38, a URL (abbreviation of Uniform Resource Locator) 39, and an assignment ID 40. The URL 39 is position information on the Internet of an authentication application 76 to be installed on a terminal device (e.g., the mobile terminal 70). The assignment ID 40 is a character string indicating an ID to be assigned to the terminal device. The assignment ID 40 includes a combination of a MAC address "XXX" of the MFP 10, and a numeral part which is a plurality of digits (two digits in the present embodiment). The numerical part has "00" as an initial value. Each time the assignment ID 40 is assigned to a terminal device, the numeral of the numerical part is incremented by "1", generating the new assignment ID 40.

A user name, password, authentication ID, print allowing information, and scan allowing information are associated with each other in the user table 38. The user name, the password, the print allowing information and the scan allowing information are registered in the user table 38 by, e.g., an administrator of the MFP 10 operating the operation unit 12, or by accessing the MFP 10 from a terminal device. The print allowing information and the scan allowing information respectively indicate whether or not the user is allowed to perform the printing function and the scanning function. "OK" in the allowing information indicates that use of the function is allowed, and "NG" indicates that use of the function is not allowed. The authentication ID is identification information for identifying the authentication card 50 or the mobile terminal 70, and is registered by a registration process (FIG. 3) to be described later. Moreover, in a modification, the user table 38 may be stored in a memory of an external device different from the MFP 10. In this case, the MFP 10 can communicate with the external device to use the information in the user table 38.

(Configuration of Authentication Card 50)

The authentication card 50 comprises an NFC I/F 52 which is an NFC tag. The authentication card 50 usually does not have OS software and applications. The NFC I/F 52 corresponds to one type of types A, F, and V (in other words, supports only one type). The NFC I/F 52 corresponding to type A is an I/F (i.e., card) conforming to communication standard "ISO/IEC14443" and is further classified into an I/F conforming to specific standard "ISO/IEC14443-4" conforming to communication standard "ISO/IEC14443", and an I/F not conforming to specific standard "ISO/IEC14443-4". The former I/F is a Mifare Desfire type card conforming to a specific communication protocol "T-CL" for non-contact cards. Further, the latter I/F is a Mifare (registered trademark) type card not conforming to the communication protocol "T-CL". The NFC I/F 52 corresponding to type F is a card conforming to communication standard "ISO/IEC18092", e.g., a card such as FeliCa (registered trademark) Standard, FeliCa Lite, etc. Further, the NFC I/F 52 corresponding to type V is a card conforming to communication standard "ISO/IEC15693".

(Configuration of Mobile Terminal 70)

The mobile terminal 70 is a portable terminal device such as a mobile telephone, a smartphone, a PDA, a notebook PC, a tablet PC, a portable music playback device or a portable movie playback device. The mobile terminal 70 comprises an NFC I/F 72 and OS software 74. The NFC I/F 72 is an NFC forum device, and is capable of operating in the P2P mode and the CE mode. The NFC I/F 72 may be capable of or incapable of operating in the R/W mode. The OS software 74 is software for controlling various basic operations of the mobile terminal 70.

The mobile terminal 70 may further comprise the authentication application 76. The authentication application 76 is an application for causing the MFP 10 to execute an authentication by using the mobile terminal 70. The authentication application 76 is an application provided by a vendor of the MFP 10, and is installed in the mobile terminal 70 from, e.g., a server on the Internet.

Figure 2:
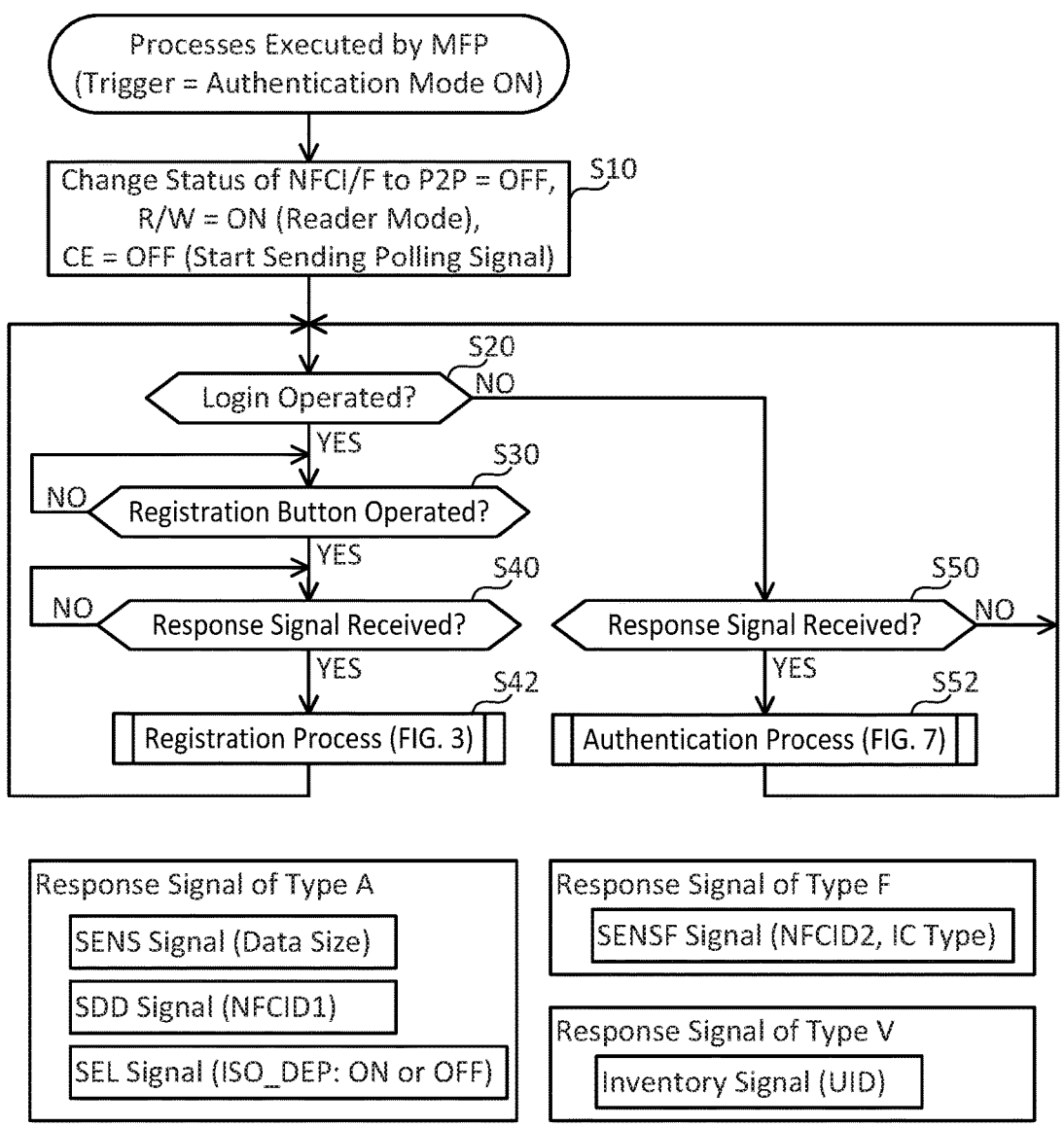
FIG. 2 shows a flowchart of processes executed by an MFP.

(Processes Executed by MFP 10; FIG. 2)

Next, processes executed by the CPU 32 in a case where an authentication mode of the MFP 10 has been set to ON will be described with reference to FIG. 2. The authentication mode is a mode in which an NFC communication with a target device (e.g., the authentication card 50, the mobile terminal 70) is to be performed, and processes related to authentication are to be executed. The processes of FIG. 2 are started when an operation for changing the authentication mode from OFF to ON is performed on the operation unit 12 by the user.

In S10, the CPU 32 supplies an instruction for changing the operation mode to the NFC I/F 20, changing the operation mode of the NFC I/F 20 to "P2P mode=OFF", "R/W mode=ON" and "CE mode=OFF". Here, "P2P mode=OFF" means that the NFC I/F 20 is incapable of executing an operation (e.g., both sending and reeiving of a Polling signal) in accordance with the P2P mode. Further, "R/W mode=ON" means that the NFC I/F 20 is capable of executing an operation (e.g., sending of the Polling signal) in accordance with the R/W mode. Further, "CE mode=OFF" means that the NFC I/F 20 is incapable of executing an operation (e.g., sending of a response signal to the Polling signal) in accordance with the CE mode. In particular, in S10, the CPU 32 supplies an instruction for operating in Read Only to the NFC I/F 20, and operates the NFC I/F 20 in only the Reader mode of the R/W mode. Consequently, the NFC I/F 20 is capable of executing an operation in accordance with the Reader mode (e.g., reading information from the target device (i.e., receiving information)), but is incapable of executing an operation in accordance with the Writer mode (e.g., writing of information to the target device (i.e., sending information)).

In S10, further, the CPU 32 instructs the NFC I/F 20 to send Polling signals corresponding to each type of type A, F, and V. As a result, the NFC I/F 20 repeatedly sends each Polling signal corresponding to each type in sequence.

In S20, the CPU 32 monitors whether a login operation has been executed on the operation unit 12 by the user. In a case where the combination of the user name and password registered in the user table 38 has been input in the operation unit 12, the CPU 32 determines YES in S20, and proceeds to S30.

In S30, the CPU 32 monitors whether a registration button for registering the authentication ID in the user table 38 has been operated. In a case where the registration button has been operated, the CPU 32 determines YES in S30, and proceeds to S40.

In S40, the CPU 32 monitors whether a response signal to the Polling signal has been received from the target device via the NFC I/F 20. As described above, the NFC I/F 20 repeatedly sends each Polling signal corresponding to each type of type A, F, and V in sequence. In case of receiving a response signal to a Polling signal corresponding to any type, the NFC I/F 20 establishes an NFC communication session with the target device. For example, in case of receiving a response signal to a Polling signal corresponding to type A when the Polling signal was sent, the NFC I/F 20 supplies information indicating type A to the controller 30. Similarly, in case of receiving a response signal corresponding to another communication type, the NFC I/F 20 supplies information indicating that type and information within the response signal to the controller 30. In case of acquiring this information from the NFC I/F 20, the CPU 32 determines YES in S40, and proceeds to S42.

The response signal of type A includes an SENS (abbreviation of SENS_RES Response) signal, an SDD (abbreviation of SDD_RES Response) signal, and an SEL (abbreviation of SEL_RES Response) signal. The SENS signal includes information indicating data size of an NFCID1, which is a device ID of the type A. The SDD signal includes the NFCID1. The SEL signal includes ISO_DEP (abbreviation of Data Exchange Protocol defined in ISO/IEC14443-4) information. The ISO_DEP information indicates one value of "ON", meaning that the target device supports ISO_DEP, or "OFF", meaning that the target device does not support ISO_DEP.

The response signal of type F includes an SENSF signal. The SENSF signal includes an NFCID2, which is a device ID of the type F, and an IC type of the NFC I/F of the target device.

The response signal of type V includes an Inventory signal. The Inventory signal includes an UID (abbreviation of Universal ID), which is a device ID of the type V.

As described above, the device ID is an ID having a different name for each communication type. The device IDs corresponding to the communication types A, F and V are "NFCID1", "NFCID2" and "UID", respectively. NFCID1 and NFCID2 are defined respectively by the NFC forum, and UID is not defined by the NFC forum.

In the case where the target device is an authentication card, the device ID is a unique ID pre-assigned to each authentication card. That is, the device ID does not overlap between two or more authentication cards. Consequently, the device ID of an authentication card corresponding to type A, F, or V is suitable for authentication.

Further, in the case where the target device is a mobile terminal, the device ID is usually prepared by OS software. For example, when the response signal to the Polling signal is to be sent, the OS software randomly determines a character string, and determines the character string as the device ID. Consequently, if the device ID received from the mobile terminal is registered in the user table 38, the device ID received from the mobile terminal thereafter is usually different from the registered device ID. Consequently, the device ID received from the mobile terminal is not suitable for authentication. Consequently, in the present embodiment, the assignment ID 40 prepared by the MFP 10 is assigned to the mobile terminal as the authentication ID, and the authentication is executed using that authentication ID.

In S42, the CPU 32 executes a registration process (see FIG. 3) related to registering the authentication ID of the target device in the user table 38. When S42 ends, the process returns to S20.

Further, in S50, the CPU 32 monitors whether a response signal to the Polling signal has been received from the target device via the NFC I/F 20 without executing the login operation (NO in S20). S50 is the same as S40 and, in case of acquiring information corresponding to the communication type from the NFC I/F 20, the CPU 32 determines YES in S50, and proceeds to S52.

In S52, the CPU 32 executes an authentication process (see FIG. 7) related to authentication of the target device. When S52 ends, the process returns to S20.

Figure 3:
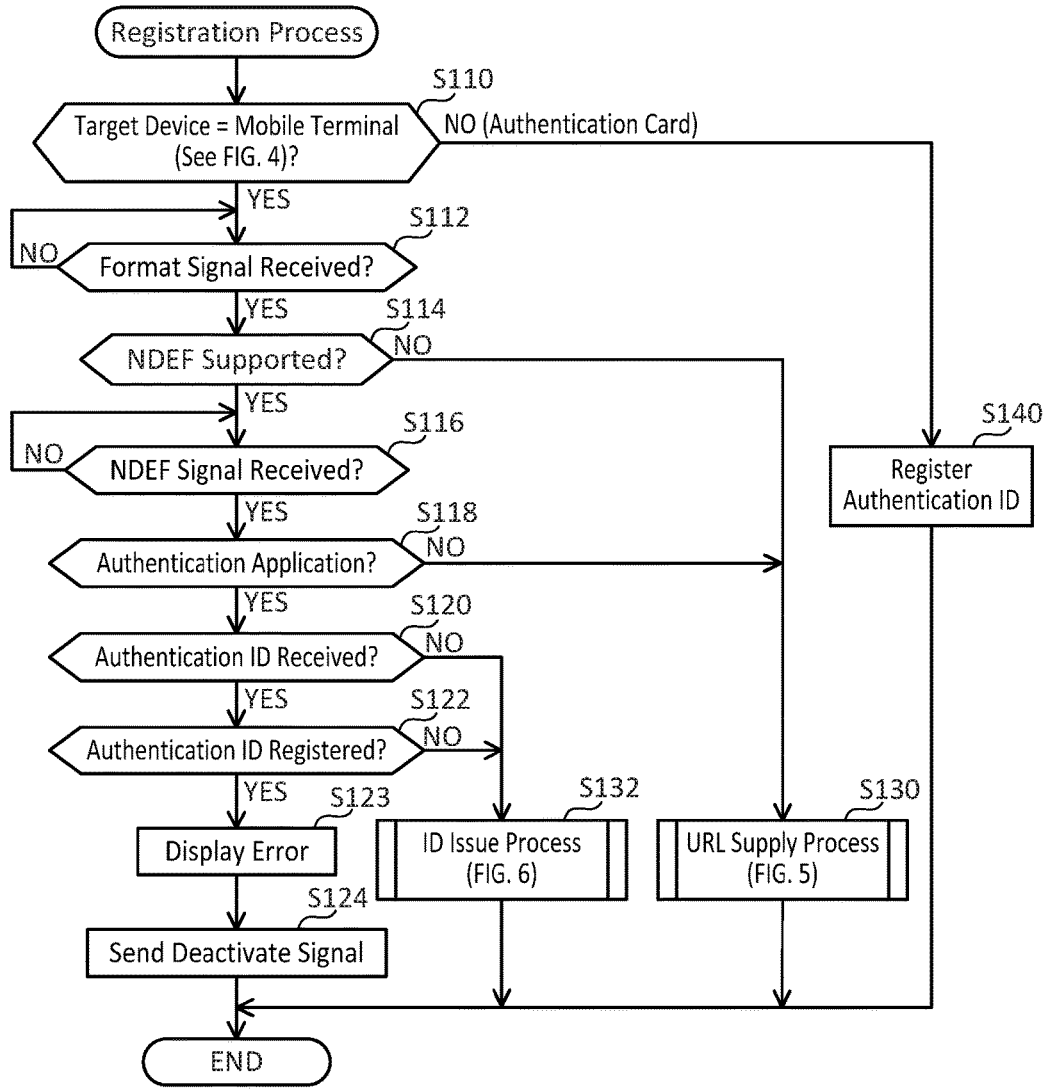
FIG. 3 shows a flowchart of a registration process.

(Registration Process; FIG. 3)

Next, contents of the registration process executed in S42 of FIG. 2 will be described with reference to FIG. 3. In S110, the CPU 32 determines whether the target device is the mobile terminal 70 or the authentication card 50. Specifically, the CPU 32 executes the determination of S110 in the manner described below by using the information acquired in S40 of FIG. 2 (i.e., the information indicating the type and the information in the response signal), and the table shown in FIG. 4.

In a case where the communication type of the target device is type A, the CPU 32 specifies the type of the target device by using the data size information included in the SENS signal, and the ISO_DEP information included in the SEL signal. The CPU 32 determines that the target device is the Mifare type authentication card 50 in a case where the ISO_DEP information is "OFF", determines that the target device is the Mifare Desfire type authentication card 50 in a case where the ISO_DEP information is "ON" and the data size information is "7 bytes", and determines that the target device is the mobile terminal 70 in a case where the ISO_DEP is "ON" and the data size information is "4 bytes".

Further, in a case where the communication type of the target device is type F, the CPU 32 specifies the type of the target device by using the IC type included in the SENSF signal. The CPU 32 determines that the target device is the mobile terminal 70 in a case where the IC type is a predetermined type (e.g., 06h, 07h, 10h to 13h, and 14h to 1Fh), and determines that the target device is the authentication card 50 in a case where the IC type is not the predetermined type.

In a case where the communication type of the target device is type V, the target device cannot be the mobile terminal 70, and is the authentication card 50. Consequently, in the case where the communication type of the target device is type V, the CPU 32 determines that the target device is the authentication card 50.

In case of determining that the target device is the authentication card 50 (NO in S110), the CPU 32 proceeds to S140. In the case where the target device is the authentication card 50, the device ID of the target device can be used for the authentication of the target device. Consequently, in S140, the CPU 32 registers the device ID acquired in S40 of FIG. 2 in the user table 38 as the authentication ID corresponding to the user name and password input in S20 of FIG. 2. That is, the CPU 32 registers the NFCID1 if the target device is the authentication card 50 corresponding to type A, registers the NFCID2 if the target device is the authentication card 50 corresponding to type F, and registers the UID if the target device is the authentication card 50 corresponding to type V.

On the other hand, in case of determining that the target device is the mobile terminal 70 (YES in S110), the CPU 32 proceeds to S112. In S112, the CPU 32 monitors whether a Format signal has been received. The NFC I/F 20 sends a request signal to the mobile terminal 70, and receives a Format signal including Format information from the mobile terminal 70. In case of receiving the Format signal, the NFC I/F 20 supplies the Format information to the controller 30. In this case, the CPU 32 determines YES in S112, and proceeds to S114. The Format information indicates either value of "ON", meaning that the mobile terminal 70 is capable of executing communication of the NDEF signal, or "OFF", meaning that the mobile terminal 70 is incapable of executing communication of the NDEF signal. In the mobile terminal 70, the Format information is set to "ON" in a case where any application using the NDEF has been installed.

In S114, based on the Format information, the CPU 32 determines whether the mobile terminal 70 supports NDEF. In a case where the Format information indicates "ON", the CPU 32 determines that the mobile terminal 70 supports NDEF (YES in S114), and proceeds to S116. On the other hand, in a case where the Format information indicates "OFF", the CPU 32 determines that the mobile terminal 70 does not support NDEF (NO in S114), and proceeds to S130.

In S116, the CPU 32 monitors whether an NDEF signal is received. The NFC I/F 20 sends a request signal to the mobile terminal 70, and receives the NDEF signal from the mobile terminal 70. In case of receiving the NDEF signal, the NFC I/F 20 supplies NDEF information to the controller 30. In this case, the CPU 32 determines YES in S116, and proceeds to S118. The NDEF information includes ID of an application that has been installed in the mobile terminal 70 (called "application ID" below). Further, the NDEF information may include the authentication ID of the mobile terminal 70.

In S118, the CPU 32 determines whether the application ID included in the NDEF information acquired in S116 matches an application ID "ZZZ" of the authentication application 76. The CPU 32 proceeds to S120 in a case where the application ID included in the NDEF information matches "ZZZ" (YES in S118), and proceeds to S130 in a case where the application ID included in the NDEF information does not match "ZZZ" (NO in S118).

In S120, the CPU 32 determines whether the NDEF information acquired in S116 includes the authentication ID. The CPU 32 proceeds to S122 in case of determining that the NDEF information includes the authentication ID (YES in S120). On the other hand, the CPU 32 proceeds to S132 in case of determining that the NDEF information does not include the authentication ID (NO in S120).

In S122, the CPU 32 determines whether the authentication ID included in the NDEF information is registered in the user table 38. The CPU 32 proceeds to S123 in case of determining that the authentication ID included in the NDEF information is registered in the user table 38 (YES in S122). On the other hand, the CPU 32 proceeds to S132 in case of determining that the authentication ID included in the NDEF information is not registered in the user table 38 (NO in S122). For example, a situation is assumed in which, after the assignment ID 40 has been registered in the user table 38 as the authentication ID, an administrator deletes the authentication ID from the user table 38. In this case, the NDEF information includes the authentication ID, but the authentication ID is not registered in the user table 38, and NO is determined in S122.

In S123, the CPU 32 causes the display unit 14 to display an error screen indicating that the authentication ID has been registered in the user table 38. Thus, the user can know that there is no need to register the authentication ID.

In S124, the CPU 32 supplies a sending instruction of a Deactivate signal to the NFC I/F 20. Thus, the NFC I/F 20 sends the Deactivate signal to the mobile terminal 70 and, consequently, the NFC communication session established in S40 of FIG. 2 is disconnected. When S124 ends, the process of FIG. 3 ends.

Further, in S130, the CPU 32 executes a URL supply process (see FIG. 5) for supplying the URL 39 to the mobile terminal 70. When S130 ends, the process of FIG. 3 ends.

Further, in S132, the CPU 32 executes an ID issue process (see FIG. 6) for assigning the assignment ID 40 to the mobile terminal 70 as the authentication ID. When S132 ends, the process of FIG. 3 ends.

Figure 5:
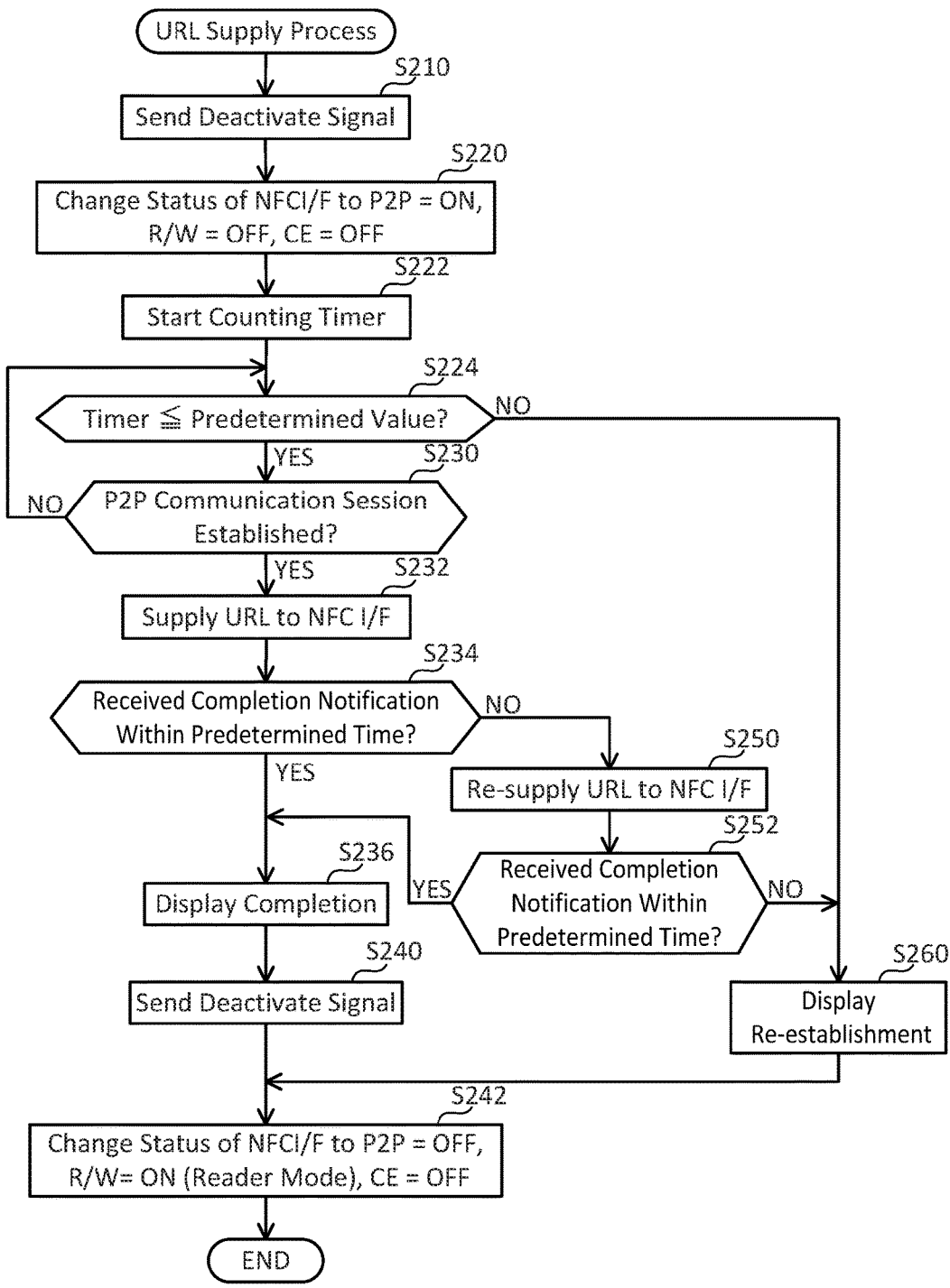
FIG. 5 shows a flowchart of a URL supply process.

(URL Supply Process; FIG. 5)

Next, the URL supply process executed in S130 of FIG. 3 will be described with reference to FIG. 5. The process of FIG. 5 is executed in a case where the target device is the mobile terminal 70, and the mobile terminal 70 does not install the authentication application 76.

S210 is the same as S124 of FIG. 3. In S220, the CPU 32 supplies an instruction for changing the operation mode to the NFC I/F 20, changing the operation mode of the NFC I/F 20 to "P2P mode=ON", "R/W mode=OFF", and "CE mode=OFF". Here, "P2P mode=ON" means that an operation in accordance with the P2P mode can be executed. Further, "R/W mode=OFF" means that an operation in accordance with the R/W mode cannot be executed. When the operation mode is changed in S220, the NFC I/F 20 can send a Polling signal, and can receive a response signal to the signal from the mobile terminal 70. Further, the NFC I/F 20 can receive the Polling signal from the mobile terminal 70, and send a response signal to the signal to the mobile terminal 70. In either case, it is possible to establish a P2P communication session with the mobile terminal 70 operating in the P2P mode.

In S222, the CPU 32 starts counting a timer. In S224, the CPU 32 monitors whether a count value of the timer exceeds a predetermined value. In a case where the count value of the timer exceeds the predetermined value (NO in S224), i.e., in a case where the P2P communication session with the mobile terminal 70 is not established for a long time, in S260, the CPU 32 causes the display unit 14 to display a re-establish screen requesting re-establishment of the NFC communication session with the mobile terminal 70. Specifically, the re-establish screen includes a message requesting the mobile terminal 70 to be brought closer to the MFP 10. When S260 ends, the process proceeds to S242.

Further, in S230, the CPU 32 monitors whether a P2P communication session has been established with the mobile terminal 70. In case of acquiring information from the NFC I/F 20 indicating that the P2P communication session has been established (YES in S230), the CPU 32 proceeds to S232.

In S232, the CPU 32 supplies the URL 39 in the memory 34 to the NFC I/F 20. As a result, the URL 39 is stored in a memory in the NFC I/F 20. Upon supply of the URL 39, the NFC I/F 20 sends the URL 39 to the mobile terminal 70 by using the P2P communication session. it should be noted that, in a modification, the CPU 32 may not supply the URL 39, but an AAR (abbreviation of "Android Application Record") including a package name of the authentication application 76 to the NFC I/F 20, and the NFC I/F 20 may send the AAR to the mobile terminal 70. The package name is obtained by arranging a domain in its reverse order, such as "com.example.android.beam". That is, the information sent to the mobile terminal 70 only have to be identification information for identifying a specific application program, and for the mobile terminal 70 to install the specific application program.

In S234, the CPU 32 determines whether completion notification has been received from the mobile terminal 70 within a predetermined time from the supply of the URL 39 in S232. The completion notification is sent to the MFP 10 from the mobile terminal 70 in a case where the receiving of the URL 39 in the mobile terminal 70 has been completed. Upon receiving the completion notification, the NFC I/F 20 sends information indicating that the completion notification has been received to the CPU 32. In a case where the information has been acquired within the predetermined time, the CPU 32 determines YES in S234, and proceeds to S236. On the other hand, in a case where the predetermined time has elapsed without the information being acquired, the CPU 32 determines NO in S234, and proceeds to S250.

In S250, the CPU 32 re-supplies the URL 39 to the NFC I/F 20. S252 is the same as S234. The CPU 32 proceeds to S236 in case of determining YES in S252, and proceeds to S260 in case of determining NO in S252.

In S236, the CPU 32 causes the display unit 14 to display a completion screen indicating that the sending of the URL 39 to the mobile terminal 70 has been completed.

S240 is the same as S210. Due to this, the P2P session established in S230 is disconnected.

In S242, the CPU 32 supplies an instruction for changing the operation mode to the NFC I/F 20, changing the operation mode of the NFC I/F 20 to "P2P mode=OFF", "R/W mode=ON", and "CE mode=OFF". Further, the CPU 32 supplies an instruction for operating in Read Only to the NFC I/F 20, causing the NFC I/F 20 to operate only in the Reader mode of the R/W mode. Due to this, the operation mode of the NFC I/F 20 returns to the operation mode of S10 of FIG. 2. That is, the MFP 10 returns the operation mode of the NFC I/F 20 to the operation mode in the initial status. In this way, the MFP 10 can appropriately return the operation mode of the NFC I/F 20 to the operation mode in the initial status in the case where the sending of the URL 39 to the mobile terminal 70 has been completed (S236), and in the case where the completion notification is not received even after the predetermined time has elapsed (S260). When S242 ends, the process of FIG. 5 ends.

Figure 6:
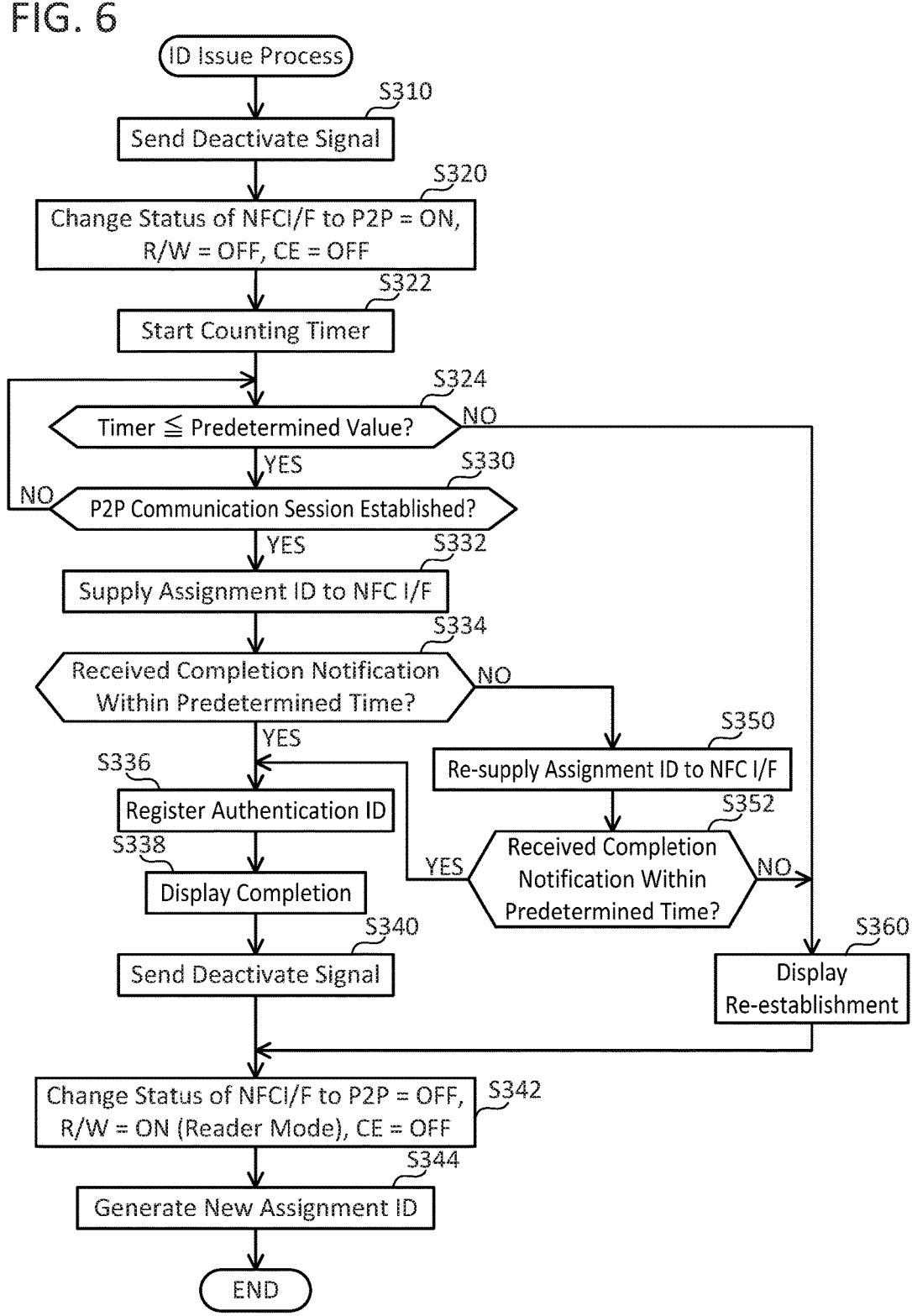
FIG. 6 shows a flowchart of an ID issue process.

(ID Issue Process; FIG. 6)

Next, an ID issue process executed in S132 of FIG. 3 will be described with reference to FIG. 6. The process of FIG. 6 is executed in a case where the target device is the mobile terminal 70, and the authentication application 76 has been installed in the mobile terminal 70.

S310 to S330 are the same as S210 to S230 of FIG. 5. Further, S360 is the same as S260. S332, S334, S350, S352 are the same as S232, S234, S250, S252 of FIG. 5, except for the point that the assignment ID 40 in the memory 34 is supplied instead of the URL 39 to the NFC I/F 20.

In S336, the CPU 32 registers the assignment ID 40 in the user table 38 as the authentication ID corresponding to the user name and password input in S20 of FIG. 2. In S338, the CPU 32 causes the display unit 14 to display a completion screen indicating that registration of the authentication ID has been completed. S340, S342 are the same as S240, S242 of FIG. 5. In this way, the MFP 10 can appropriately return the operation mode of the NFC I/F 20 to the operation mode in the initial status in the case where the registration of the authentication ID has been completed (S338), and in the case where the completion notification is not received even after the predetermined time has elapsed (S360).

In S344, the CPU 32 increments the numerical part of the current assignment ID 40 only by "1", to generate a new assignment ID 40. Due to this, it is possible to prevent an assignment ID that is the same as the assignment ID assigned to the mobile terminal 70 from being assigned to a mobile terminal different from the mobile terminal 70. When S344 ends, the process of FIG. 6 ends.

Figure 7:
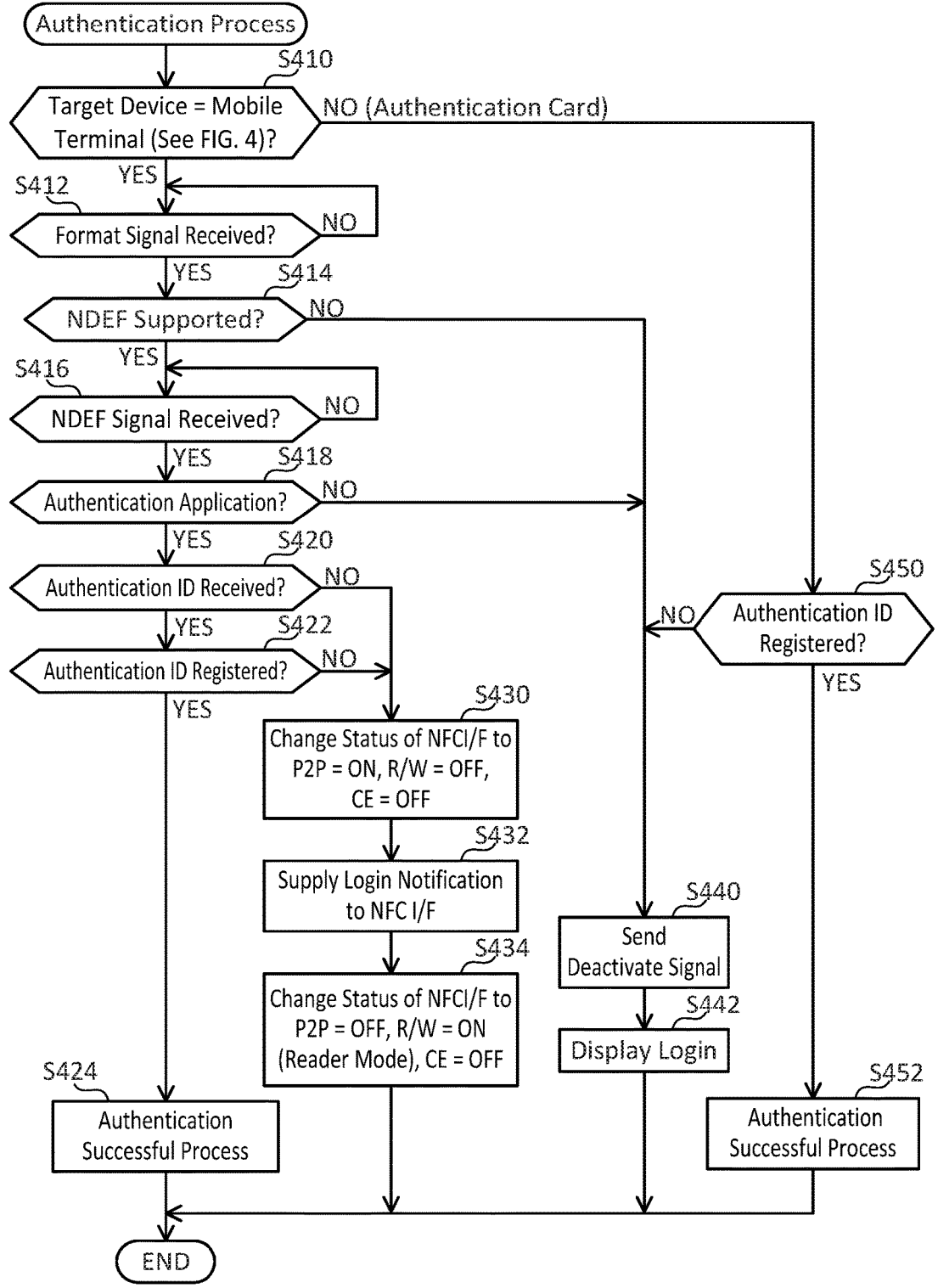
FIG. 7 shows a flowchart of an authentication process.

(Authentication Process; FIG. 7)

Next, an authentication process executed in S52 of FIG. 2 will be described with reference to FIGS. 7. S410 to S422 are the same as S110 to S122 of FIG. 3. The process proceeds to S450 in case of NO in S410, proceeds to S440 in case of NO in S414 or S418, and proceeds to S430 in case of NO in S420 or S422.

In S424, the CPU 32 allows the use of functions corresponding to each allowing information associated with the authentication ID included in the NDEF information. Specifically, in a case where the print allowing information is "OK", the CPU 32 allows execution of printing. For example, when an operation for downloading print data from a server on the Internet is executed on the operation unit 12 by the user, the CPU 32 can receive the print data, and cause the print executing unit 16 to execute printing of an image represented by the print data. Further, in a case where the scan allowing information is "OK", the CPU 32 allows execution of scanning For example, when an operation for executing a scan is executed on the operation unit 12 by the user, the CPU 32 causes the scan executing unit 18 to scan a document. When S424 ends, the process of FIG. 7 ends. Thus, according to the present embodiment, by bringing the mobile terminal 70 closer to the MFP 10, the user can cause the MFP 10 to execute authentication using the authentication ID. The user can cause the MFP 10 to execute the function without executing the login operation in which the user ID and password are input to the MFP 10 (NO in S20 of FIG. 2).

In S430, after supplying a Deactivate signal sending instruction to the NFC I/F 20, the CPU 32 supplies an instruction to the NFC I/F 20 for changing the operation mode, changing the operation mode of the NFC I/F 20 to "P2P mode=ON", "R/W mode=OFF", and "CE mode=off".

In S432, in case of acquiring information from the NFC I/F 20 indicating that a P2P communication session with the mobile terminal 70 has been established, the CPU 32 supplies a login notification to the NFC I/F 20 requesting execution of the login operation (see S20 of FIG. 2) and the registration button operation (see S30). As a result, the login notification is stored in the memory in the NFC I/F 20. Upon the login notification being supplied, the NFC I/F 20 sends the login notification to the mobile terminal 70 by using the P2P communication session. Thus, the mobile terminal 70 displays the login notification. Thus, the user can know that the login operation to the MFP 10 and the registration button operation are to be executed. S434 is the same as S210 of FIG. 5.

In S434, after supplying the Deactivate signal sending instruction to the NFC I/F 20, the CPU 32 supplies an instruction to the NFC I/F 20 for changing the operation mode, changing the operation mode of the NFC I/F 20 to "P2P mode=OFF", "R/W mode=ON", and "CE mode=OFF". Further, the CPU 32 supplies the instruction for operating in Read Only to the NFC I/F 20, causing the NFC I/F 20 to operate only in the Reader mode of the R/W mode. Thus, the operation mode of the NFC I/F 20 returns to the operation mode of S10 of FIG. 2.

Further, S440 is the same as S434. In S442, the CPU 32 causes the display unit 14 to display a login screen requesting execution of the login operation (see S20 of FIG. 2) and of the registration button operation (see S30), whereby the user can know that the login operation to the MFP 10 and the registration button operation are to be executed.

Further, S450, S452 are the same as S422, S424, excepting the point that a device ID (i.e., the NFCID1, the NFCID2, or the UID (see FIG. 2)) received from the authentication card 50 is used. Thus, according to the present embodiment, by bringing the authentication card 50 closer to the MFP 10, the user can cause the MFP 10 to execute the authentication using the authentication ID. The user can cause the MFP 10 to execute the function without executing the login operation in which the user ID and password are input to the MFP 10 (NO in S20 of FIG. 2).

(Specific Cases)

Next, specific cases A to C realized by the processes of FIG. 2 to FIG. 7 will be described with reference to FIG. 8 to FIG. 10. In the initial status of each case, the authentication mode of the MFP 10 is set to "ON", and consequently the operation mode of the NFC I/F 20 is set to "P2P mode=OFF" "R/W mode=ON" and "CE mode=OFF", and is set to be operable only in the Reader mode of the R/W mode (S10 of FIG. 2).

(Case A; FIG. 8)

In case A, the target device is the mobile terminal 70A corresponding to type A, and is the mobile terminal 70A in which the authentication application 76 is not installed.

In T10, the MFP 10 repeatedly sends, in sequence, each Polling signal corresponding to types A, F, and V (S10 of FIG. 2).

In T20, the MFP 10 accepts input (i.e., a login operation) of the user information including the combination of a user name "U3" and a password "P3" (YES in S20 of FIG. 2) and, in T22, accepts operation of the registration button (YES in S30).

When the user brings the mobile terminal 70A close to the MFP 10, and the mobile terminal 70A receives the Polling signal corresponding to type A from the MFP 10 whereupon, in T28, the OS software 74 of the mobile terminal 70A randomly generates a character string, and determines the character string as NFCID1 "B 1".

In T30, in response to the sending of the Polling signal of type A, the MFP 10 receives a response signal from the mobile terminal 70A operating in the CE mode including the data size "4 bytes" of the NFCID1, the NFCID1 "B 1", and the ISO_DEP information "ON" (YES in S40), and establishes the NFC communication session with the mobile terminal 70.

Since the ISO_DEP information indicates "ON", and the data size information of the NFCID1 indicates "4 bytes", the MFP 10 determines that the target device is the mobile terminal 70A (YES in S110 of FIG. 3.). Then, the MFP 10 sends a request signal to the mobile terminal 70 by using the NFC communication session established in T30 and, in T32, receives a Format signal including the Format information "NDEF=OFF" from the mobile terminal 70A (YES in S112).

The MFP 10 determines that the mobile terminal 70 does not support NDEF (NO in S114) and, in T40, sends the Deactivate signal to the mobile terminal 70A (S210 of FIG. 5). Thus, the communication session established in T30 is disconnected. In T42, the MFP 10 changes the operation mode of the NFC I/F 20 to "P2P mode=ON", "R/W mode=OFF" and "CE mode=OFF" (S220)

T50 is the same as T10. In T60, the MFP 10 receives a response signal corresponding to type A from the mobile terminal 70A, and establishes a P2P communication session with the mobile terminal 70A (YES in S230). Then, in T70, the MFP 10 sends the URL 39 to the mobile terminal 70A by using the P2P communication session established in T60 (S232) and, in T80, receives the completion notification from the mobile terminal 70A (YES in S234).

Upon receiving the completion notification (YES in S234), in T82, the MFP 10 sends a Deactivate signal to the mobile terminal 70A (S240). Thus, the P2P communication session established in T60 is disconnected. Then, in T84, the MFP 10 changes the operation mode of the NFC I/F 20 to "P2P mode=OFF", "R/W mode=ON", and "CE mode=OFF", causing the NFC I/F 20 to operate only in the Reader mode of the R/W mode (S242).

In T90, the mobile terminal 70A accesses the URL 39 by using a web browser (not shown), and displays an install screen for installing the authentication application 76. In T92, the mobile terminal 70A installs the authentication application 76 in response to the user operating the mobile terminal 70A.

(Case B; FIG. 9)

Next, a case B will be described with reference to FIG. 9. Case B is a continuation of case A of FIG. 8, and the authentication application 76 has been installed in the mobile terminal 70A (T92 of FIGS. 8). T120 to T130 of FIG. 9 are the same as T20 to T30 of FIG. 8, excepting the point that the NFCID1 generated by the mobile terminal 70A is "B2". Further, T132 is the same as T32 of FIG. 8, excepting the point that the NDEF information indicates "ON" due to the authentication application 76 having been installed in the mobile terminal 70A.

Based on the Format information "NDEF=ON", the MFP 10 determines that the mobile terminal 70A supports the NDEF (YES in S114 of FIG. 3) and, in T134, receives an NDEF signal including the application ID "ZZZ" by using the NFC communication session established in T130 (YES in S116). The NDEF signal does not include the authentication ID. As a result, the MFP 10 determines that the authentication application 76 has been installed in the mobile terminal 70A (YES in S118), determines that the authentication ID has not been received (NO in S120).

Figure 8:
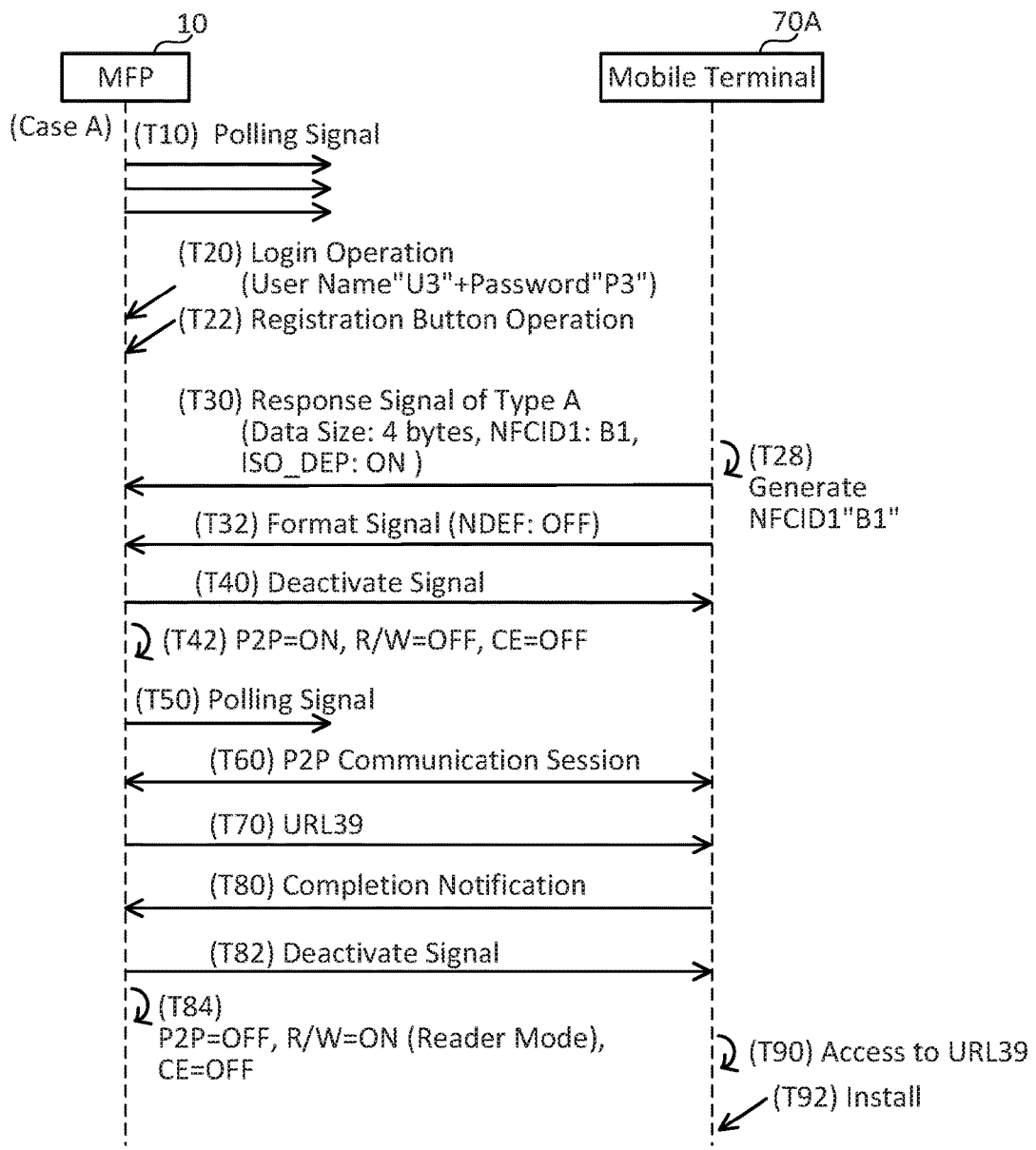
FIG. 8 shows a sequence diagram of a case A of sending a URL to a mobile terminal.

T140 to T160 are the same as T40 to T60 of FIG. 8. T170 is the same as T70, excepting the point that an assignment ID "XXX02" is sent to the mobile terminal 70A. Further, T180 is the same as T80. In T182, the mobile terminal 70A registers the assignment ID "XXX02" as the authentication ID.

Upon acquiring the completion notification (YES in S334 of FIG. 6), in T184, the MFP 10 registers the assignment ID "XXX02" in the user table 38 as the authentication ID corresponding to the user name "U3" and password "P3" (S336).

T190, 192 are the same as T82, 84 of FIG. 8. In T194, the MFP 10 generates a new assignment ID "XXX03" (S344).

T210 is the same as T10 of FIG. 8. Here, the login operation and the registration button operation are not executed (NO in S20 of FIGS. 2). T228 to T232 are the same as T128 to T132, excepting the point that the NFCID1 generated by the mobile terminal 70A is "B3" (YES in S50, YES in S412 of FIG. 7). Further, T234 is the same as T134 (YES in S416), excepting the point that the NDEF signal includes the authentication ID "XXX02" due to the fact that the authentication ID "XXX02" has been registered in the mobile terminal 70A (T182).

The MFP 10 determines that the NDEF signal includes the authentication ID "XXX02" (YES in S420) and, in T236, determines that the authentication ID "XXX02" is registered in the user table 38 (YES in S422). Thus, in T238, the MFP 10 can execute an authentication of the authentication ID "XXX02", and can execute the printing function allowed for the user "U3".

(Case C; FIG. 10)

Next, a case C will be described with reference to FIG. 10. Case C is a continuation of case B of FIG. 9. In case C, the target device is a mobile terminal 70B different from the mobile terminal 70A, and the authentication application 76 has been installed in the mobile terminal 70B.

In T320, the MFP 10 accepts input (i.e., a login operation) of the user information including the combination of a user name "U4" and password "P4" (YES in S20 of FIGS. 2). T330 to T360 are the same as T130 to T160 of FIG. 9, excepting the point that the NFCID1 generated by the mobile terminal 70B is "C1".

In T370, the MFP 10 registers an assignment ID "XXX03" in the mobile terminal 70B. T380 to T392 are the same as T180 to T192 of FIG. 9, excepting the point that the assignment ID "XXX03" is used. In T394, the MFP 10 generates a new assignment ID "XXX04" (S344).

According to the present case, since the authentication ID "XXX03" can be assigned to the mobile terminal 70B, thereafter the MFP 10 can execute an authentication of the authentication ID "XXX03" received from the mobile terminal 70B when the mobile terminal 70B is brought closer to the MFP 10.

(Effect of Present Embodiment)

According to the present embodiment, the MFP 10 operates in the Reader mode in the initial status. Consequently, the MFP 10 can receive the authentication ID from the authentication card 50, and execute an authentication using the authentication ID (YES in S50 of FIG. 2, S450 of FIG. 7). Further, the MFP 10 can receive the authentication ID from the mobile terminal 70, and execute an authentication using the authentication ID (YES in S50 of FIG. 2, S422 of FIG. 7). Then, in order to execute an authentication of the mobile terminal 70, the MFP 10 operates as follows. That is, in a case where the NDEF signal not including the authentication ID is received from the mobile terminal 70 (T134 of FIG. 9) in a situation where the NFC I/F 20 operates in the Reader mode and the mobile terminal 70 operates in the CE mode, the MFP 10 changes the operation mode of the NFC I/F 20 from the Reader mode to the P2P mode (T142), supplies the assignment ID "XXX02" to the NFC I/F 20, and the NFC I/F 20 sends the assignment ID "XXX02" to the mobile terminal 70 (T170). Thus, the mobile terminal 70 registers the assignment ID "XXX02" as the authentication ID (T182). Then, in a case of receiving the NDEF signal including the authentication ID "XXX02" from the mobile terminal 70 (T234) in a situation where the NFC I/F 20 operates in the Reader mode and the mobile terminal 70 operates in the CE mode, the MFP 10 executes an authentication using the authentication ID "XXX02" (T236, T238) without changing the operation mode of the NFC I/F 20 from the Reader mode. Thus, without depending on the operation mode of the mobile terminal 70, and depending on whether or not the NDEF signal received from the mobile terminal 70 includes the authentication ID, the MFP 10 changes whether to change the operation mode of the NFC I/F 20, and can appropriately switch between whether to send the assignment ID "XXX02" to the mobile terminal 70 or to execute an authentication using the received authentication ID "XXX02".

(Correspondence Relationship)

The MFP 10, the mobile terminal 70A, the mobile terminal 70B, and the authentication card 50 are an example of "communication device", "first terminal device", "second terminal device" and "card", respectively. The user table 38 is an example of "predetermined area". The NDEF signal T134 of FIG. 9, the NDEF signal of T234, and the NDEF signal of T334 of FIG. 10 are an example of "first specific signal", "second specific signal" and "fifth specific signal", respectively. The response signal received from the authentication card 50 in S40 of FIG. 2, and the response signal received from the authentication card 50 in S50 are an example of "third specific signal" and "fourth specific signal", respectively. The assignment ID "XXX02" of FIG. 9, and the assignment ID "XXX03" of FIG. 9 and FIG. 10 are an example of "first authentication information" and "third authentication information", respectively. The NFCID1 of the authentication card 50 is an example of "second authentication information". The Reader mode, the CE mode, and the P2P mode are an example of "first operation mode", "second operation mode", and "third operation mode", respectively.

(Modification 1) For example, in an environment where use of the authentication card 50 is not assumed, the authentication of the authentication card 50 need not be executed. In this case, S110, S140 of FIG. 3, S410, S450, S452 of FIG. 7 can be omitted. In the present modification, "receive a third specific signal", "store the second authentication information in the predetermined area", "receive a fourth specific signal", and "execute an authentication using the second authentication information" can be omitted.

(Modification 2) The generation of the new assignment ID (S344 of FIG. 6) may be executed between S332 and S334. That is, the new assignment ID may be generated after supplying the assignment ID 40 to the NFC I/F 20, and before receiving the completion notification from the mobile terminal 70. Further, in another modification, the generation of the new assignment ID (S344) may be executed between S330 and S332. That is, the new assignment ID may be generated each time a P2P communication session with the mobile terminal 70 is established (S330). That is, "generate third authentication information" may generate the third authentication information different from the first authentication information before the first authentication information has been sent to the first terminal device.

(Modification 3) In a case where NO is determined in S334 and S352, the CPU 32 may monitor the establishment of the P2P communication session in S330 while maintaining the operation mode of the NFC I/F 20 in the P2P mode without proceeding to S342. In the present modification, "change the operation mode of the NFC interface from the third operation mode to the first operation mode in a case where a predetermined time has been lapsed," can be omitted.

(Modification 4) Instead of S310 and S320 of FIG. 6, the CPU 32 may operate the NFC I/F 20 only in the Writer mode of the R/W mode. In this case, instead of S330, the CPU 32 may monitor whether an NFC communication session is established for the NFC I/F 20 to operate in the Writer mode and the mobile terminal 70 to operate in the CE mode. Then, the CPU 32 may send the assignment ID to the mobile terminal 70 by using the NFC communication session. In the present modification, the Writer mode is an example of "third operation mode". Further, in another modification, the CPU 32 may send the assignment ID to the mobile terminal 70 by using an NFC communication session for the NFC I/F 20 to operate in the CE mode and the mobile terminal 70 to operate in the Reader mode. In the present modification, the CE mode is an example of "third operation mode".

(Modification 5) The assignment ID 40 may not include the MAC address and may be, e.g., a plurality of random character strings.

(Modification 6) "Communication device" may not be the MFP 10 capable of executing a plurality of functions, but may be a printer capable of executing only the printing function, a scanner capable of executing only the scanning function, a PC, a server, a mobile terminal, etc.

(Modification 7) In the above embodiment, each of the processes of FIG. 2 to FIG. 7 is implemented by the CPU 32 of the MFP 10 executing the program 36 (i.e., software). Instead, at least one of the processes of FIG. 2 to FIG. 7 may be implemented by hardware such as a logic circuit.

What is claimed is:

1. A communication device comprising:
   an NFC (abbreviation of Near Field Communication) interface configured to perform a wireless communication according to NFC standard;
   a processor; and
   a memory storing computer-readable instructions therein, the computer-readable instructions, when executed by the processor, causing the communication device to:
   receive a first specific signal not including authentication information from a first terminal device via the NFC interface in a case where the NFC interface operates in a first operation mode of the NFC standard and the first terminal device operates in a second operation mode of the NFC standard, the first operation mode being for the communication device to receive a signal via the NFC interface;
   change the operation mode of the NFC interface from the first operation mode to a third operation mode of the NFC standard in a case where the first specific signal is received, the third operation mode being for the communication device to send a signal via the NFC interface;
   supply first authentication information to the NFC interface in the case where the first specific signal is received, wherein the NFC interface operates in the third operation mode and sends the first authentication information to the first terminal device;
   store the first authentication information in a second memory in the case where the first specific signal is received;
   change the operation mode of the NFC interface from the third operation mode to the first operation mode in a case where the first authentication information has been sent to the first terminal device;
   receive a second specific signal including the first authentication information from the first terminal device via the NFC interface in a case where the NFC interface operates in the first operation mode and the first terminal device operates in the second operation mode after the operation mode of the NFC interface has been changed from the third operation mode to the first operation mode; and
   execute an authentication using the first authentication information by determining whether the first authentication information included in the second specific signal is stored in the second memory without changing the operation mode of the NFC interface from the first operation mode in a case where the second specific signal is received.

2. The communication device as in claim 1, wherein the computer-readable instructions, when executed by the processor, further cause the communication device to:
   receive a third specific signal including second authentication information from a card of the NFC standard via the NFC interface in a case where the NFC interface operates in the first operation mode;
   store the second authentication information in the second memory without changing the operation mode of the NFC interface from the first operation mode in a case where the third specific signal is received;
   receive a fourth specific signal including the second authentication information from the card via the NFC interface in a case where the NFC interface operates in the first operation mode after the second authentication information has been stored in the second memory; and
   execute an authentication using the second authentication information by determining whether the second authentication information included in the fourth specific signal is stored in the second memory without changing the operation mode of the NFC interface from the first operation mode in a case where the fourth specific signal is received.

3. The communication device as in claim 1, wherein the computer-readable instructions, when executed by the processor, further cause the communication device to:
   generate third authentication information different from the first authentication information in a case where the first authentication information has been sent to the first terminal device;
   receive a fifth specific signal not including authentication information from a second terminal device different from the first terminal device via the NFC interface in a case where the NFC interface operates in the first operation mode and the second terminal device operates in the second operation mode after the third authentication information has been generated;
change the operation mode of the NFC interface from the first operation mode to the third operation mode in a case where the fifth specific signal is received;
supply the third authentication information to the NFC interface in the case where the fifth specific signal is received, wherein the NFC interface operates in the third operation mode and sends the third authentication information to the second terminal device; and
store the third authentication information in the second memory in the case where the fifth specific signal is received.

4. The communication device as in claim 1, wherein
the computer-readable instructions, when executed by the processor, further cause the communication device to:
change the operation mode of the NFC interface from the third operation mode to the first operation mode in a case where a predetermined time has been lapsed, before sending of the first authentication information to the first terminal device is completed, after the first authentication information has been supplied to the NFC interface.

5. The communication device as in claim 1, wherein
the second specific signal includes a data description area defined by an NDEF (abbreviation of NFC Data Exchange Format); and
the first authentication information is described in the data description area.

6. The communication device as in claim 1, wherein
the third operation mode is P2P (abbreviation of Peer to Peer) mode of the NFC standard.

7. The communication device as in claim 1, wherein
the first authentication information is information in which a predetermined character string is added to a MAC address of the communication device.

8. The communication device as claimed in claim 1, wherein
the first memory and second memory are different areas of the same memory.

9. The communication device as claimed in claim 1, wherein
the second memory is a memory of the communication device different from the first memory.

10. The communication device as claimed in claim 1, wherein
the second memory is a memory of an external device different from the communication device.

11. A non-transitory computer-readable recording medium storing computer-readable instructions for a communication device,
wherein the computer-readable instructions, when executed by a processor of the communication device, causing the communication device to:
receive a first specific signal not including authentication information from a first terminal device via an NFC (abbreviation of Near Field Communication) interface in a case where the NFC interface operates in a first operation mode of the NFC standard and the first terminal device operates in a second operation mode of the NFC standard, the NFC interface being configured to perform a wireless communication according to NFC standard, and the first operation mode being for the communication device to receive a signal via the NFC interface;
change the operation mode of the NFC interface from the first operation mode to a third operation mode of the NFC standard in a case where the first specific signal is received, the third operation mode being for the communication device to send a signal via the NFC interface;
supply first authentication information to the NFC interface in the case where the first specific signal is received, wherein the NFC interface operates in the third operation mode and sends the first authentication information to the first terminal device;
store the first authentication information in a memory in the case where the first specific signal is received;
change the operation mode of the NFC interface from the third operation mode to the first operation mode in a case where the first authentication information has been sent to the first terminal device;
receive a second specific signal including the first authentication information from the first terminal device via the NFC interface in a case where the NFC interface operates in the first operation mode and the first terminal device operates in the second operation mode after the operation mode of the NFC interface has been changed from the third operation mode to the first operation mode; and
execute an authentication using the first authentication information by determining whether the first authentication information included in the second specific signal is stored in the memory without changing the operation mode of the NFC interface from the first operation mode in a case where the second specific signal is received.

12. A method performed by a communication device, the method comprising:
receiving a first specific signal not including authentication information from a first terminal device via an NFC (abbreviation of Near Field Communication) interface in a case where the NFC interface operates in a first operation mode of the NFC standard and the first terminal device operates in a second operation mode of the NFC standard, the NFC interface being configured to perform a wireless communication according to NFC standard, and the first operation mode being for the communication device to receive a signal via the NFC interface;
changing the operation mode of the NFC interface from the first operation mode to a third operation mode of the NFC standard in a case where the first specific signal is received, the third operation mode being for the communication device to send a signal via the NFC interface;
supplying first authentication information to the NFC interface in the case where the first specific signal is received, wherein the NFC interface operates in the third operation mode and sends the first authentication information to the first terminal device;
storing the first authentication information in a memory in the case where the first specific signal is received;
change the operation mode of the NFC interface from the third operation mode to the first operation mode in a case where the first authentication information has been sent to the first terminal device;
receiving a second specific signal including the first authentication information from the first terminal device via the NFC interface in a case where the NFC interface operates in the first operation mode and the first terminal device operates in the second operation mode after the operation mode of the NFC interface has been changed from the third operation mode to the first operation mode; and executing an authentication using the first authentication information by determining whether the first authentication information included in the second specific signal is stored in the memory without changing the operation mode of the NFC interface from the first operation mode in a case where the second specific signal is received.

* * * * *